United States Patent [19]

Evans

[11] 3,806,639

[45] Apr. 23, 1974

[54] GUARD CIRCUIT AND DWELL TIME LIMITING METHOD FOR THREE LEVEL ANALOG ENCODERS

[75] Inventor: John Brian Evans, Welwyn Garden City, England

[73] Assignee: Xerox Corporation, Stamford, Conn.

[22] Filed: May 16, 1972

[21] Appl. No.: 253,754

[52] U.S. Cl. ............ 178/6, 178/DIG. 3, 179/2 DP, 179/2 TV, 179/15.55 R, 325/148, 340/208

[51] Int. Cl. ............ H04n 1/02

[58] Field of Search .......... 178/DIG. 3, 6.6 R, 6, 66, 178/68; 179/2 DP, 2 TV, 15.55 R; 325/145, 148, 163; 340/208

[56] References Cited

UNITED STATES PATENTS 3,426,150 2/1969 Tygart .......... 178/66 UX
3,591,711 6/1971 De Groat .......... 178/6
3,538,246 11/1970 Macorski et al. .......... 178/DIG. 3

*Primary Examiner*—Malcolm A. Morrison
*Assistant Examiner*—R. Stephen Dildine, Jr.

[57] ABSTRACT

A guard circuit is combined with a three level encoder so that the encoder may be employed, for example, in a facsimile transmitter to drive a voltage controlled oscillator to thereby provide a facsimile signal suitable for transmission over a standard commercial telephone network, even should the network have one or more inband signaling frequencies within a predetermined one of the half bands of the nominal frequency range for the facsimile signal. The guard circuit limits the time the facsimile signal is permitted to dwell in the predetermined half band of its frequency range to a period which is short relative to the finite response time of the inband signaling equipment within the telephone network, thereby precluding the facsimile signal from interfering with the normal operation of the signaling equipment.

12 Claims, 3 Drawing Figures

GUARD CIRCUIT AND DWELL TIME LIMITING METHOD FOR THREE LEVEL ANALOG ENCODERS

BACKGROUND OF THE INVENTION

This invention relates generally to telecommunications and, more particularly, to methods and apparatus which may be advantageously utilized, for example, to permit transmission of facsimile signals over standard, commercially available telephone networks, including international circuits, without risk of interfering with the normal operation of the inband signaling equipment conventionally included in such networks for supervisory and control purposes.

It has been recognized that commercial telephone systems offer a relatively convenient and economical alternative to other types of communication links that might be employed for carrying facsimile signals. Telephone facilities are available in most locations throughout the world, and telephony has advanced to the point that it is a relatively simple matter to establish a circuit between any two or more subscriber terminals, regardless of the distance involved. For that reason, substantial time and effort have been devoted to developing facsimile systems which are compatable with existing telephone networks. For example, others have addressed the problem of holding the bandwidth required for transmission of a facsimile signal within the capabilities of standard telephone lines. As is known, such lines typically have a relatively narrow bandwidth encompassing voice frequencies within a nominal range of about 100 Hz.–3,500 Hz. However, experience has demonstrated that facsimile signals which are to be transmitted over such lines should be confined to an even narrower band of approximately 200 Hz.–2,600 Hz., because signals outside that range tend to suffer from excessive transmission attenuation and distortion. The conventional practice in facsimile systems intended for use with the telephone-type links is, therefore, to control the rate at which the graphic information to be transmitted is scanned (i.e., the so-called "scan rate") and to employ one of the various three level encoding techniques (e.g., alternate binary encoding, dibinary encoding, and duobinary encoding) that have been devised for reducing the bandwidth required for transmission of the facsimile signal. Of course, the use of a bandwidth reduction or compression technique increases the permissable scan rate, thereby reducing the time necessary to transmit a given quantity of graphic information.

Another problem encountered in the transmission of facsimile signals via telephone is in preventing such signals from interfering with the normal operation of the inband signaling equipment included in modern telephone systems to carry out important supervisory and control functions, The signaling equipment is activated in response to a control signal having a predetermined frequency within the normal voice frequency band of the telephone system (the inband signaling frequency) and a predetermined duration equal to the finite response time of the signaling equipment. The problem of preventing the facsimile signal from being inadvertently detected as being a control signal for the inband signaling equipment is more complex than it might appear to be because there is no standard inband signaling frequency applicable to all telephone systems. To the contrary, there is substantial variance from country to country. For example, the inband signaling frequencies employed in the United States and Great Britan, are 2,600 Hz. and 2,280 Hz., respectively. One solution first proposed by Paul H. DeGroat—U.S. Pat. No. 3,591,711 issued July 7, 1971 to the assignee of the instant application—is to define the inband signaling frequency or frequencies of concern, together with suitable upper and lower guard bands, as being forbidden zones and to include in the transmitter provision for shifting the facsimile signal to a fixed frequency outside any such zone whenever the signal tends to remain in a forbidden zone for a period approaching the response time of the inband signaling equipment. There is substantial merit to that approach in as much as it effectively precludes the facsimile signal from interfering with the normal operation of the inband signaling equipment. That is, however, accomplished at the cost of sacrificing some of the information content of the facsimile signal. Specifically, the ability to discriminate between signals that would be tramsmitted at different frequencies were they not shifted to the aforementioned fixed frequency to avoid the appearance of being control signals for the inband signaling equipment is lost.

SUMMARY OF THE INVENTION

The primary object of the present invention is to provide methods and means for achieving compatability between facsimile systems and commercial telephone networks having one or more inband signaling frequencies within the nominal frequency range for the facsimile signal, with the compatability being obtained without sacrificing any of the material information content of the facsimile signal.

In a broader sense, however, it will become apparent that this invention is of a general applicability to three level encoders of the type employed to selectively shift analog signals between upper and lower ranges on either side of a predetermined midpoint level in as much as methods and means are provided for limiting the time the encoded signal from such an encoder is permitted to dwell in a predetermined one of those ranges.

A more detailed object of the instant invention is to provide methods and means for precluding a facsimile signal supplied by a three level encoder in a facsimile transmitter associated with a commercial telephone network for interfering with the normal operation of the inband signaling equipment included in such network, even should the network have one or more inband signaling frequencies within the nominal frequency range for the facsimile signal.

Another detailed object of this invention is to provide a methods and means for insuring that a facsimile tramsmitter of the foregoing type is compatable with international telephone networks, with the compatability being achieved while still remaining all of the material information content of the facsimile signal.

A specific object of the present invention is to provide a methods and means for enabling a facsimile signal supplied by a three level analog encoder to be transmitted over a commercial telephone network, without risk of interfering with the normal operation of the inband signaling equipment included in such network, even should there be one or more inband signal frequencies within a predetermined half band of the nominal frequency range for the facsimile signal.

An even more specific object is to provide methods and means for limiting the time that the frequency of the facsimile signal supplied by an encoder of the foregoing type is permitted to dwell in the predetermined half band of its nominal frequency range to a period which is short relative to the response time of the inband signal equipment included in the telephone network.

A further specific object of this invention is to provide methods and means for use with a facsimile transmitter of the foregoing type to control the time the facsimile signal is permitted to dwell in the predetermined half band of its nominal frequency range as a function of any prior excursions of the signal into that half band, up to a maximum permissable dwell time which is selected to be short relative to the response time of the inband signaling equipment included in the associated telephone network.

Finally, it is an object of the present invention to provide relatively economical and reliable methods and means for preventing a facsimile signal from interfering with the normal operation of the inband signaling equipment included within a telephone network over which the facsimile signal is to be transmitted.

BRIEF DESCRIPTION OF THE DRAWINGS

Other objects and advantages of this invention will become apparent when the following detailed description is read in conjunction with the attached drawings, in which.

DETAILED DESCRIPTION OF THE ILLUSTRATED EMBODIMENT

Figure 1:
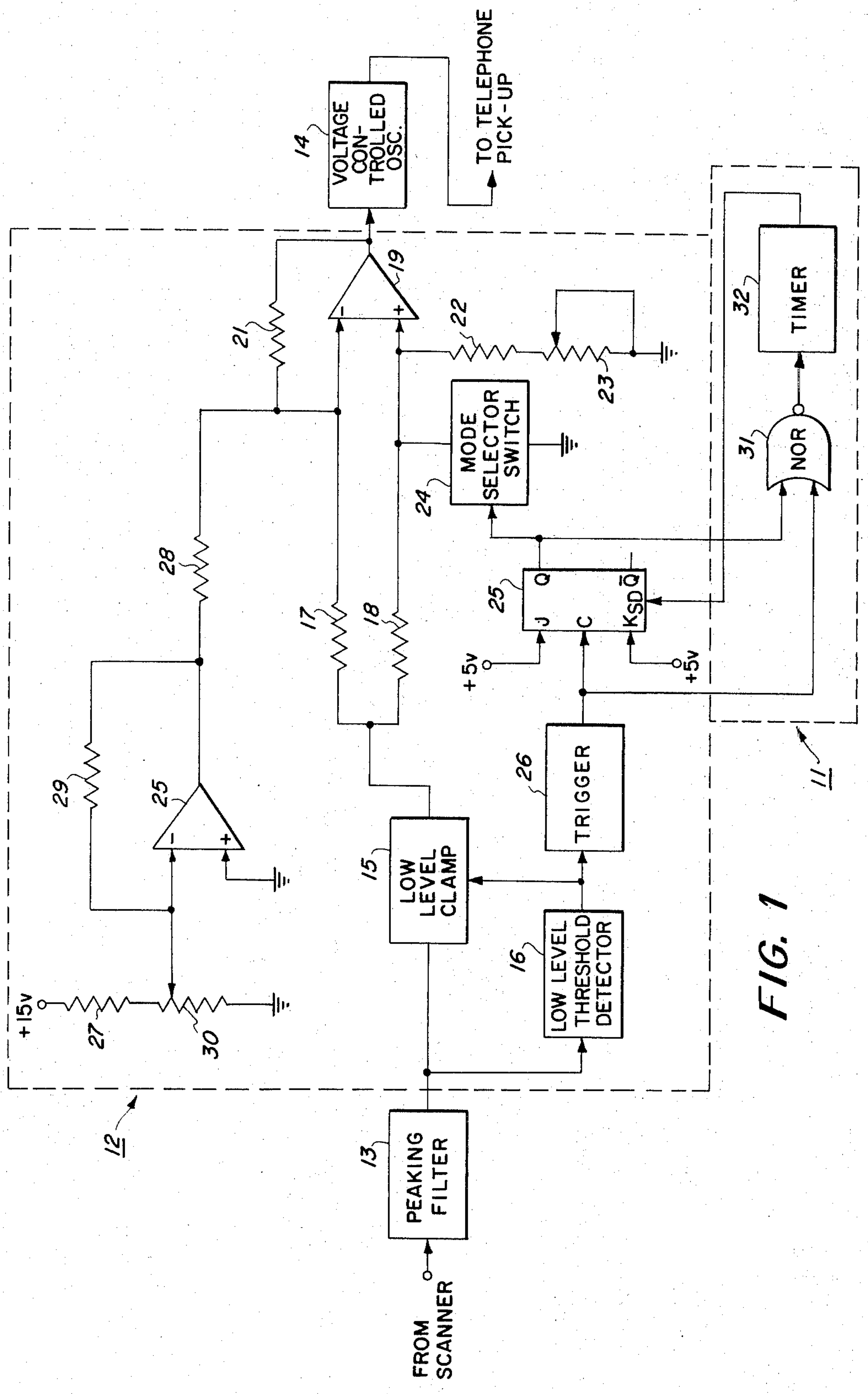
FIG. 1 is a simplified block diagram illustrating a portion of a facsimile transmitter including the combination of an alternate analog encoder with a guard circuit in accordance with the present invention.

While the invention will be described in detail hereinafter with reference to a specific embodiment, it is to be understood that the intent is not to limit it to that embodiment. To the contrary, the intent is to cover all alternatives, modifications, and equivalents falling within the spirit and scope of the invention as defined by the appended claims.

To put this invention in proper perspective at the very outset, it is worth noting that three level encoders of the type referred to herein function to selectively shift an analog input signal (sometimes referred to as a "two level signal.") between a pair of adjacent ranges above and below a predetermined midpoint level. The encoded output signal (sometimes referred to as a "three level signal"), therefore, swings about the midpoint level or, in other words, is bipolar relative to that level. As previously mentioned, others have recognized that such an encoder may be advantageously utilized in facsimile systems intended for operation over bandwidth limited transmission links, such as ordinary commercial telephone networks. The three level encoding reduces or compresses the bandwidth required for satisfactory transmission of the facsimile signal by factor as great as two.

There are a number of different types of three level encoders, including alternate analog encoders, dibinary encoders, and duobinary encoders. While there are structural and functional distinctions permitting such encoders to be distinguished from one another, they generally share the common characteristic of comprising a bistable means, typically a flip-flop circuit, together with some sort of control means for selectively switching the bistable means for one stable state to the other which, in turn, causes the encoded output signal to shift from one side of its midpoint level to the other. Or, put another way, the encoded output signal is selectively shifted between a pair of adjacent ranges above and below a predetermined midpoint level as, for example, a flip-flop circuit is set and reset.

Now, in accordance with the present invention, a guard circuit is provided to limit the time that the output signal supplied by a three level encoder is permitted to dwell in a predetermined one of the two adjacent ranges into which such signal may be shifted. When the permissible dwell time expires, the guard circuit provides a signal which independently triggers the bistable means, thereby changing or reversing the operating state of the bistable means to shift the encoded signal to the other of the ranges. In the first instance, it is typically the voltage characteristic of the encoded signal that is shifted from range to range. It is not, however, at all unusual to have three level encoders combined with the various types of converters. For example, in facsimile systems, a customary practice is to have the encoder drive a voltage controlled oscillator which converts the encoded output signal into a frequency modulated signal so that the graphic information is presented in a form which is more suitable for transmission by a standard telephone network. Of course, with that arrangement, as the encoded output signal shifts from one side to the other of its midpoint level, the frequency modulated signal shifts from one side to the other of a predetermined center frequency.

Indeed, the practice of using a frequency modulated signal to carry graphic information for transmission over commercial telephone networks leads to the risk that the facsimile signal will interfere with the normal operation of the inband signal equipment comprised by the typical telephone network, at least if one or more of the inband signaling frequencies is within the nominal frequency range for the facsimile signal. For example, taking a typical facsimile system in which the nominal frequency range for the modulated facsimile signal is from 1,800 Hz. to 2,440 Hz. with a center frequency at 2,120 Hz., it is apparent that the characteristic inband signaling frequency used in Great Britain (2,280 Hz.) is within the upper half band of the nominal frequency range for the facsimile signal. It will, therefore, be appreciated that, in keeping with one of the more specific features of the present invention, the guard circuit described and claimed herein may be advantageously employed in such a system to prevent the modulated facsimile signal from dwelling in the upper half band of its nominal frequency range for a period approaching the finite response time of the inband signaling equipment. In that event, the aforementioned risk is, of course, eliminated. It is, however, to be understood that this invention is not limited to that one, specific application.

Turning now to the drawings, and particularly to FIG. 1, it will be seen that a guard circuit 11 has been shown in combination with a three level encoder 12 in accordance with the present invention. For illustrative purposes, the combination has been assumed to be included in a facsimile transmitter which is intended to be linked to a suitable facsimile receiver by a standard, commercial telephone network. Thus, the encoder 12 is indicated as having its input coupled by a peaking filter 13 to a suitable scanner (not shown) and its output coupled to drive a voltage controlled oscillator 14 which, in turn, has its output delivered to a suitable telephone pick-up device (also not shown).

In keeping with accepted practices, the scanner sweeps a document (not shown) bearing graphic information to convert the information into a video signal. The amplitude of the video signal varies as a function of the point to point variations in, say, the reflectivity of the information, with the result that the video signal typically swings between a lower limit corresponding to highly reflective white areas and an upper limit corresponding to substantially non-reflective black areas, thereby leaving an intermediate range of voltages for areas with different shades of gray. The peaking filter 13 accentuates the high frequency components of the video signal to provide high resolution between areas of different reflectivity, and the filtered video signal is then applied to the input of the three level encoder 12. The voltage controlled oscillator 14, on the other hand, converts the encoded video signal supplied by the encoder 12 into a frequency modulated signal suitable for transmission over a standard commercial telephone network.

The illustrated three level encoder is an alternate analog encoder and is similar in many respects to the encoder described and claimed in a copending and commonly assigned DeGroat et al., U.S. application filed Dec. 29, 1971 under Ser. No. 213,697 for "Alternate Analog Encoding Method and Apparatus."

Figure 2:
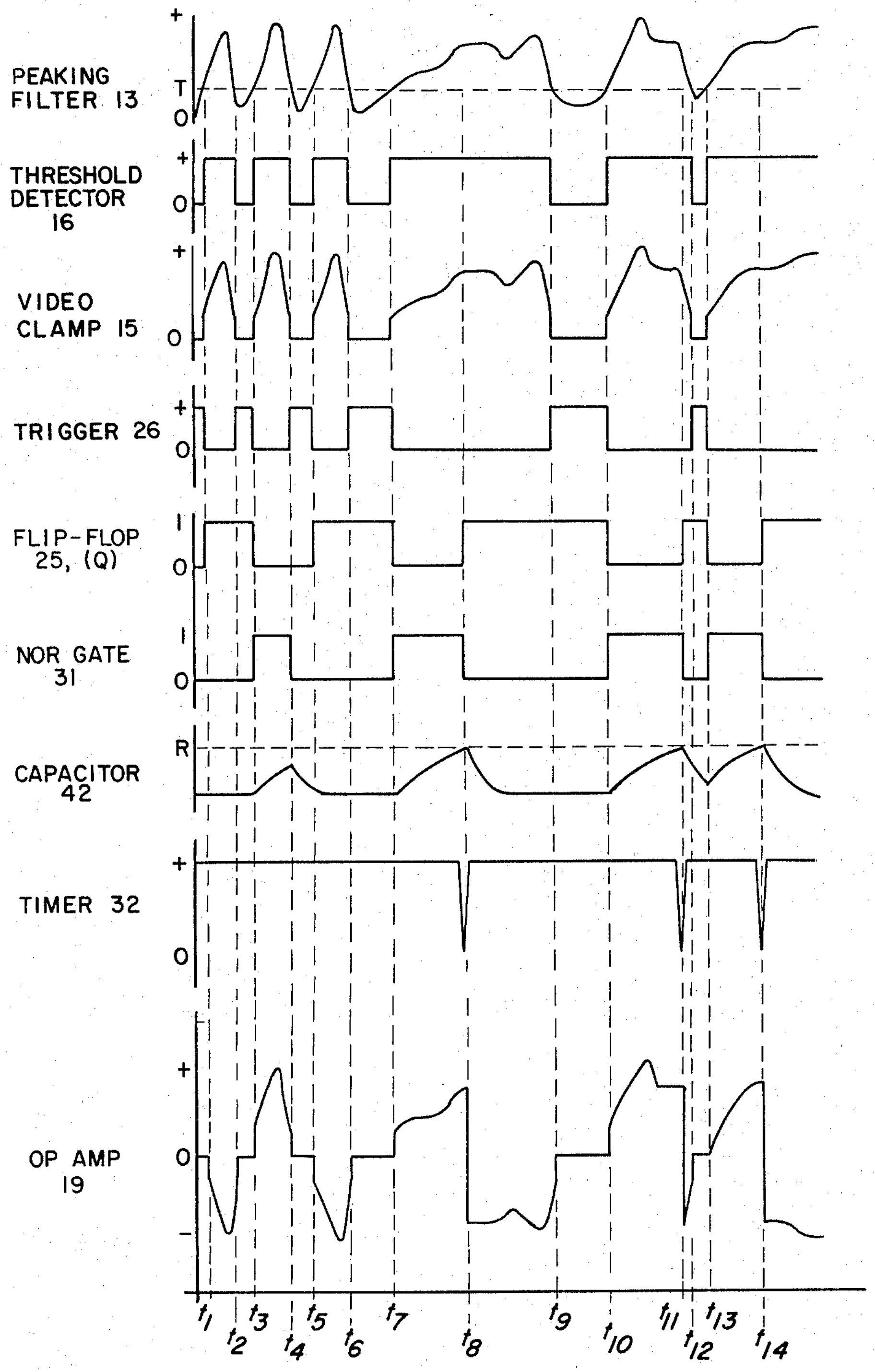
FIG. 2 is a timing chart illustrating typical voltage versus time relationships for signals occuring at various points in the combination shown in FIG. 1.

More particularly, referring additionally to FIG. 2, the filtered video signal received at the input of the encoder is applied to a low level clamp 15 and to a threshold detector 16. The clamp 15 functions as a switch and is operated under the control of the threshold detector 16 to further enhance the quality of the video signal. Specifically, the clamp 15 clamps the video signal to, say, ground potential as the lower limit corresponding to white areas whenever the voltage level of the video signal would otherwise be below a predetermined threshold level T which is selected, as accurately as possible, to distinguish actual information from an off-white background of the document being scanned of the like. To that end, the threshold detector 16 has its output coupled to a control input for the clamp 15 and is effective to supply a pulse whenever the filtered video signal is below the threshold level T, as at $t_2 - t_3$, $t_4 - t_5$, $t_6 - t_7$, etc. The clamp 15 is driven out of conduction by such a pulse to thereby clamp or force the video signal to ground.

The shaped video signal is then encoded by selectively switching an operational amplifier 19 between an inverting and a non-inverting mode of operation. Thus, as show, the output of the clamp 15 is coupled by respective resistors 17 and 18 to the inverting and non-inverting inputs of the operational amplifier 19 which, in turn, has its output coupled to the input of the voltage controlled oscillator 14 so that the oscillator is driven by the encoded video signal. To aid in establishing a desired closed loop gain factor for the operational amplifier 19, its output is returned to its inverting input by a feedback resistor 21. Further, to set a predetermined center frequency for the voltage controlled oscillator 14, the inverting input of the operational amplifier 19 is negatively biased such that the operational amplifier has a predetermined positive offset voltage under quiesient conditions (i.e., when the video signal is at ground potential), with the offset voltage being selected to cause the voltage controlled oscillator 14 to operate at the desired center frequency. The non-inverting input of the operational amplifier 19 is, on the other hand, returned to ground through the series combination of a resistor 22 and a rheostat 23 in parallel with a mode selector switch 24.

The bias for the operational amplifier 19 may suitably be supplied by another operational amplifier 25. As shown, the operational amplifier 25 is connected in an inverting configuration, with its non-inverting input grounded and its inverting input coupled to the slider of a potentiometer 30 which is connected in series with a voltage dropping resistor 27 intermediate a suitable positive supply source and ground. As will be noted, the output of the operational amplifier 25 is coupled to the inverting input of the operational amplifier 19 by a buffer resistor 28. Further, to aid in establishing a desired closed loop gain factor for the operational amplifier 25, there is a feedback resistor 29 connected between its output and its inverting input. Hence, the bias for the operational amplifier 19 may be readily adjusted to bring its output offset voltage to the desired level. Specifically, the slider of the potentiometer 30 may be manipulated while the encoder is in its quiescent state to bring the output of the operational amplifier 19 to the level required to drive the voltage controlled oscillator 14 at the desired center frequency for the frequency modulated signal.

The mode selector switch 24 enables the operational amplifier 19 to be selectively switched between an inverting and a non-inverting mode of operation. The resistors 17, 18 and 22 are chosen, together with the rheostat 23, so that when the selector switch 24 is open (in a non-conductive state) the video signals appearing at the inverting and non-inverting inputs of the operational amplifier 19 are weighted in accordance with a ratio of 1:2. The operational amplifier 19, therefore, then operates in a non-inverting mode so that its output voltage increases from the offset voltage level up to a saturation level in proportion to the amplitude of the applied video signal. On the other hand, when the mode selector switch 24 is closed (in a conductive state), the non-inverting input of the operational amplifier 19 is effectively grounded, thereby causing the operational amplifier to operate in an inverting mode so that its output voltage decreases from the offset voltage level down to a saturation level in proportion to the amplitude of the applied video signal. Preferably, the inverting and non-inverting mode transfer functions of the operational amplifier 19 are substantially symmetrical about its offset voltage level. To that end, a rheostat or the like (not shown) may be included between the clamp 15 and the common junction of the resistors 17 and 18 to be used, together with the rheostat 23, in making trimming adjustments. Specifically, the rheostats are typically adjusted so that the upper and lower limits of the nominal frequency range for the facsimile signal (the frequencies reached with the operational amplifier in non-inverting and inverting mode saturation, respectively) are displaced by the same amount from the center frequency for the facsimile signal. In that event, the center frequency effectively divides the nominal frequency range for the facsimile signal into equal upper and lower half bands, and the offset voltage of the operational amplifier 19 defines a midpoint level separating equal upper and lower adjacent ranges for the encoded video signal. Of course, the upper and lower limits of the frequency range for the facsimile signal are selected so that they are both within the pass band of the communication link with which the system is to be employed. Because of the symmetry, the polarity of the encoded video signal relative to the offset voltage of the operational amplifier 19 may be reversed without causing any change in the magnitude of the encoded signal relative to that voltage.

The mode selector switch 24 is opened and closed (i.e., switched out of and into conduction) under the control of a flip-flop circuit 25 which, in turn, is controlled by a trigger 26. As previously mentioned, the exemplary three level encoder is an alternate analog encoder. Hence, in keeping with customary practices for such encoders, the operating state of the flip-flop circuit 25 is reversed each time the video signal crosses the threshold level T in a first direction. The basic timing is, therefore, dependent on the video signal which is to be encoded.

More particularly, inasmuch as the graphic information of interest is usually comprised of dark indicia on a light background (e.g., ordinary typewritten material), a black-white-black encoding rule may be advantageously employed. That is, the upper and lower limits for the encoded video signal may represent black indicia, while its midpoint level represents white. To carry out the encoding, in accordance with the rule, the pulses supplied by the threshold detector 16 are, in the illustrated embodiment, inverted by the trigger 26, and the inverted pulses are then applied to the clock input C of the flip-flop circuit 25. The flip-flop circuit is, as indicated, a J-K type flip-flop with both its J and K inputs tied to an appropriate high ("1") logic level bias supply. As is known, a characteristic of a J-K type flip-flop circuit is that if both of its inputs are at a high ("1") logic level when a negative going transistion appears at its clock input C, the flip-flop circuit switches to complement its existing operating state. In other words, the flip-flop circuit then switches either from its set to its reset state or from its reset to its set state. In the illustrated embodiment, the set output Q of the flip-flop circuit 25 is coupled to the control input of the mode selector switch 24, and the selector switch is assumed to be opened when the flip-flop circuit is reset and closed when the flip-flop circuit is set. Accordingly, it should be understood that the encoder 12 at least tends to function in generally the same manner as other alternate analog encoders. Specifically, were it not for the overriding effect of the guard circuit 13 under certain conditions, the flip-flop circuit 25 would alternately set and reset in timed synchronism with the positive going excursions of the video signal through the threshold level T.

In accordance with this invention, the guard circuit 13 limits the time the encoded signal is permitted to dwell in a predetermined one of the two adjacent ranges into which such signal may be shifted. If the encoded signal tends to remain in the predetermined range beyond the permissible dwell time, the guard circuit 13 supplies a signal which independently reverses the operating state of the flip-flop circuit 25, thereby causing the encoded signal to shift to the other of the ranges. More particularly, in the illustrated embodiment, the guard circuit 13 limits the time the encoded video signal is permitted to dwell in a range above its midpoint level to, in turn, limit the time the facsimile signal is permitted to dwell at a frequency above its center frequency. To that end, the guard circuit 13 comprises a NOR gate 31 and a timer 32. The NOR gate 31 has one input coupled to the output of the trigger 26 and another input coupled to the set output Q of the flip-flop circuit 25. The timer 32 is, in turn, connected between the output of the NOR gate 31 and a direct set input SD of the flip-flop circuit 25.

As will be seen, the NOR gate 31 is enabled to initiate a timing cycle as soon as the flip-flop circuit 25 is switched to its reset state, provided that the video signal is then above the threshold level T to hold the output of the trigger 26 at a low level. If those conditions continue to exist for a predetermined period of time, the timer supplies a negative-going signal which causes the flip-flop circuit 25 to switch to its set state. It will, therefore, be appreciated that the illustrated guard circuit may be employed, for example, to permit the facsimile signal supplied by the voltage conrolled oscillator 14 to be transmitted over a commercial telephone network without risk of interfering with the normal operation of the inband signaling equipment comprised by such network even should one or more of the inband signaling frequencies lie with the upper half band of the nominal frequency range for the facsimile signal. Moreover, the protection is afforded without sacrificing any of the material information content of the facsimile signal. Indeed, with a black-white-black encoding rule, the only deleterious effect of including the guard circuit 13 is that occassional white dots may appear on received copies of photographs and the like. Needless to say, that is a relatively insignificant problem as compared to the problem of preventing the facsimile signal from interfering with the inband signaling equipment while retaining the information content of the facsimile signal.

Figure 3:
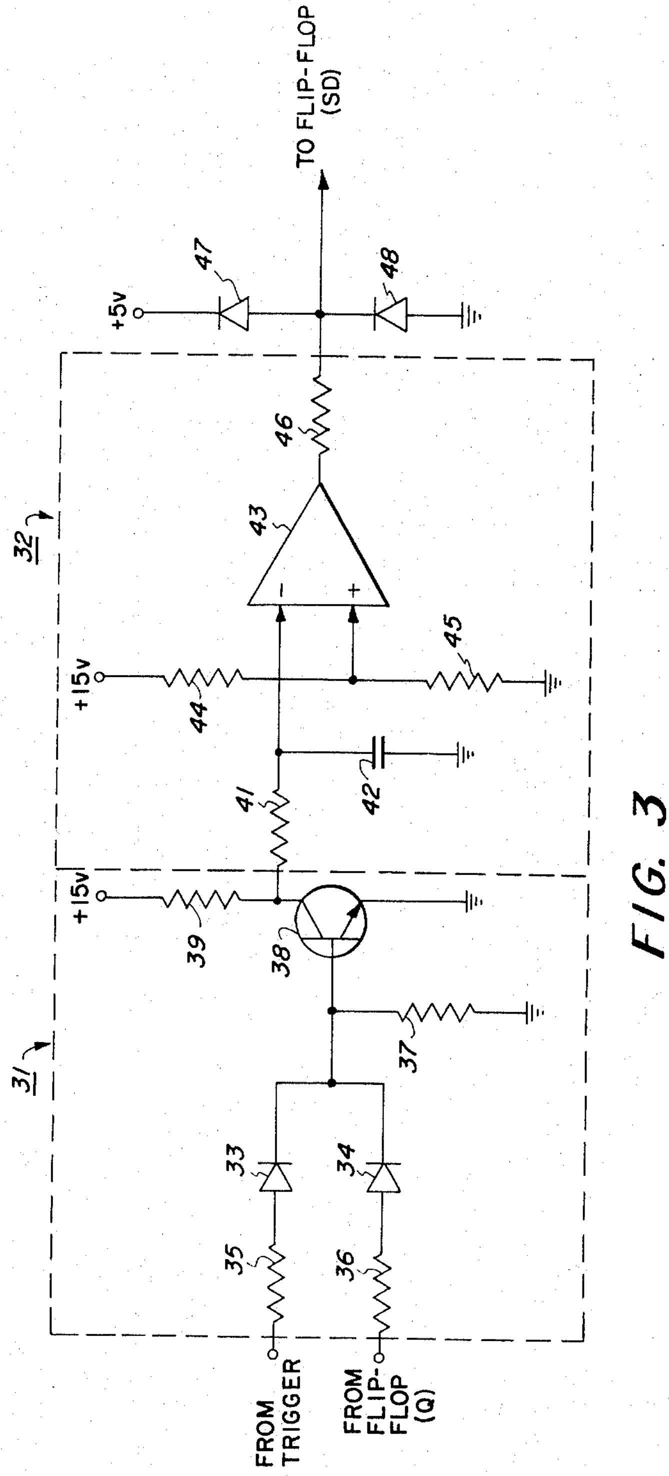
FIG. 3 is a simplified schematic diagram of a specific guard circuit suitable for use in the combination shown in FIG. 1.

Specifically, referring to FIG. 3, the NOR gate 31 may have a more or less conventional configuration. As illustrated, the gate comprises a pair of diodes 33 and 34 which have their anodes respectively coupled by resistors 35 and 36 to the output of the trigger 26 and the set output Q of the flip-flop circuit 25. The cathodes of the diodes 33 and 34 are tied together and returned to ground through a resistor 37 which, in turn, is coupled across the base-emitter circuit of a transistor 38. The transistor 38 is connected in a common emitter configuration, and it has its collector coupled to a suitable supply source by a load resistor 39, thereby permitting the output of the NOR gate 31 to be taken from the collector of the transistor 38. That is, the transistor 38 is driven into conduction by current driven through one or the other of the diodes 33 and 34, except when the video signal is above the threshold level T at the same time that the flip-flop circuit 25 is in its reset state. Thus, whenever one or both of those conditions is not met, the collector of the transistor 38 is held at a low ("O") logic level or, in other words, the NOR gate 31 is disabled. If, however, the video signal is above the threshold level T to hold the output of the trigger 26 at a low level, at the same time that the flip-flop circuit 25 is reset to hold its set output at a low level, there is no source of drive current for the transistor 38 and it is, therefore, held in a non-conductive state with its collector at a high ("1") logic level.

The timer 32 initiates a timing cycle as soon as the NOR gate 31 is enabled. If the gate 31 is not thereafter disabled before the permissible dwell time expires, the timer 32 independently switches the flip-flop circuit 25 to its set state. To that end, as shown, the timer 32 includes a resistor 41 and a capacitor 42 which, together with the load resistor 39, define a RC-type timing circuit. The resistor 41 is connected between the collector of the transistor 38 and one side of the capacitor 42, and the other side of the capacitor 42 is grounded. Thus, if the NOR gate 31 is enabled, the transistor 38 is in a non-conductive state and current, therefore, flows through the resistors 39 and 41 to charge the capacitor 42. If the NOR gate 31 is thereafter disabled, the transistor 38 is switched into conduction, thereby permitting discharge current for the capacitor 42 to flow through the resistor 41 and the collector-emitter circuit of the transistor 38. The changing timing constant for the capacitor 42 depends principally on the values of the resistors 39 and 41 and of the capacitor 42 and is selected to establish a suitable maximum permissible dwell time. For example, in applications of the guard circuit 13 to the transmission of facsimile signals via telephone links, the maximum permissible dwell time is selected to be short relative to the response time of the inband signaling equipment comprised by the telephone system. The discharge time constant for the capacitor 42 is, on the other hand, principally determined by the values of the resistor 41 and the capacitor 42. The discharge time constant governs the recovery time for the capacitor 42 and may, therefore, be selected to permit the permissible dwell time to be controlled to a desired degree as a function of any prior operation of the encoder. For example, the discharge time constant for the capacitor 42 may be selected so that the permissible dwell time is foreshortened when the flip-flop circuit 25 momentarily switches to its set state as at $t_{11}$ before reverting to its reset state as at $t_{13}$. Hence, the guard circuit 13 provides a degree of protection against, say, the inband signaling equipment being triggered by a facsimile signal which only briefly departs from the inband signaling frequency.

As will be seen, the timer 32 further includes an operational amplifier 43 for comparing the voltage developed across the capacitor 42 against a predetermined reference voltage. The reference voltage is selected so that it exceeds the voltage across the capacitor 42, except when the permissible dwell time expires while the flip-flop circuit 25 is still in its reset state. Hence, the operational amplifier 43 has its inverting input shunted by the capacitor 42 and its non-inverting input coupled to the juncture between a pair of resistors 44 and 45, which are connected in series between a suitable supply source and ground to form a voltage divider for providing the reference voltage. The output of the operational amplifier 43 is, in turn, coupled by a buffer resistor 46 to the direct set input SD of the flip-flop circuit 25. Accordingly, it will be understood that there is a negative going transistion in the output signal from the operational amplifier 43 to independently switch the flip-flop circuit 25 from its reset state to its set state whenever the voltage across the capacitor 42 builds to a level above the reference voltage level R. Preferably, the operational amplifier 43 is operated in an open loop configuration to maximize its sensitivity. In that event, however, provision should be made to prevent the direct set input SD of the flip-flop circuit 25 from being overdriven. For example, a pair of oppositely poled diodes 47 and 48 may be provided to confine the seing of the voltage applied to the direct set input of the flip-flop to a range within the rated capabilities of the circuit.

Of course, other timers of a suitable design similar to the RC timing circuit and operational amplifier described may be used. For example, the timer may comprise a capacitive means, a constant current source and means responsive to the prior excursions of the video signal, arranged in a suitable manner to provide the timing function.

CONCLUSION

It should now be apparent that a relatively economical and effective guard circuit has been provided to carry out a novel method for limiting the time the output signal of a three level encoder is permitted to dwell in a predetermined one of the two adjacent ranges into which the signal may be shifted. While the invention has been described in conjunction with a simplex facsimile system, it will be readily appreciated that it may also be embodied in a transceiver.

What is claimed is:

1. In combination with an encoder for encoding an analog input signal by selectively shifting the analog signal between a pair of ranges above and below a predetermined midpoint level, a guard circuit for limiting the time the encoded signal is permitted to dwell in a predetermined one of said ranges, said guard circuit comprising detector means coupled to said encoder for providing a first signal whenever the encoded signal is within said predetermined range, and timer means coupled between said detector means and said encoder for providing a control signal to cause said encoded signal to be shifted to the other of said ranges whenever said first signal persists for longer than a permissible dwell time, whereby the time said encoded signal is permitted to dwell in said predetermined range is limited to the permissible dwell time.

2. The combination of claim 1 wherein the permissible dwell time is adjusted downwardly from a predetermined maximum dwell period whenever the encoded signal is shifted out of and then back to said predetermined range within a time span which is short relative to a predetermined recovery time for said timer means.

3. The combination of claim 2 wherein said timer means includes a RC network having a first time constant selected to establish the maximum permissible dwell period for the encoded signal and a second time constant selected to establish the recovery time for the timer means.

4. In a telecommunication system including an encoder for encoding information carried by an analog input signal to provide an encoded analog signal and convertor means coupled to said encoder for providing a frequency modulated signal in response to said encoded signal, with said frequency modulated signal being modulated in accordance with said information and having a nominal frequency range divided into upper and lower half bands by a predetermined center frequency, a guard circuit for permitting said modulated signal to be carried by a telephone network without risk of being inadvertantly detected as being a control signal for inband signaling equipment included in said network even if said network has one or more inband signaling frequencies within a predetermined one of the half bands of the nominal frequency range of said modulated signal; said guard circuit comprising detector means coupled to send encoder for providing a first signal whenever the frequency modulated signal is within said predetermined half band, and timer means coupled between said detector means and said encoder for providing a control signal to cause said encoder to shift said frequency modulated signal to the other of said half bands whenever said first signal persists for a period approaching a predetermined finite response time of said inband signaling equipment, whereby said frequency modulated signal is precluded from dwelling in said predetermined half band for a period as long as the response time of said equipment.

5. The combination of claim 4 wherein said telecommunication system is a facsimile system, and said encoder, converter means, and guard circuit are included in a facsimile transmitter.

6. The combination of claim 4 wherein said encoder includes a bistable means which is switched between first and second stable operating states to selectively shift said frequency modulated signal between said one and said other half bands, respectively; clamp means coupled to receive said analog input signal; and threshold detector means coupled to said clamp means and responsive to said analog input signal for operating said clamp means to hold said frequency modulated signal at said center frequency whenever said analog input signal is below a predetermined threshold level; and said detector means comprises a gate means having one input coupled to said threshold detector means and another input coupled to said bistable means, said gate being enabled to supply said first signal only when said bistable means is in said first stable state and said analog input signal is above said threshold level.

7. The combination of claim 6 wherein said bistable means has a control input coupled to receive said control signal from said timer means and switches in response to said control signal from said first to said second stable state to thereby cause said frequency modulated signal to shift from said one to said other half band.

8. The combination of claim 7 wherein said timer means includes a RC network having a first time constant selected to establish a predetermined maximum permissible period for said frequency modulated signal to dwell in a said one band and a second time constant selected to establish a predetermined recovery time for said timer means.

9. The combination of claim 8 wherein said RC network automatically shortens the permissible dwell period for said frequency modulated signal whenever said bistable means is switched from said one stable state to said other stable state and then back to said one stable state within a time span shorter than the predetermined recovery time for said timer means.

10. The combination of claim 9 wherein said telecommunication system is a facsimile system, and said encoder, converter means, and guard circuit are included in a facsimile transmitter.

11. A method permitting a frequency modulated signal supplied by a converter means driven by an analog encoder to be transmitted over a telephone network containing inband signaling equipment without risk of interfering with the normal operation of said equipment even should said network have an inband signaling frequency within a predetermined half band of a nominal frequency range for said signal, said method comprising the steps of initiating a timing cycle whenever said frequency modulated signal is within said predetermined half band of its nominal frequency range, and signaling said encoder to independently shift said frequency modulated signal to another half band of its nominal frequency range whenever said modulated signal tends to dwell in said predetermined half band for longer than permissible dwell period, said permissible dwell period having a predetermined maximum duration selected to be shorter than a predetermined response time of said inband signal equipment to any signal at said signaling frequency.

12. The method of claim 11 further including the step of shortening said permissible dwell period whenever said frequency modulated signal is shifted out of and back to said predetermined half band within a period short relative to a predetermined recovery time.

* * * * *